United States Patent

Haltiner, Jr. et al.

(10) Patent No.: US 9,812,717 B2
(45) Date of Patent: Nov. 7, 2017

(54) FUEL CELL CASSETTE WITH COMPLIANT SEAL

(71) Applicant: DELPHI TECHNOLOGIES, INC., Troy, MI (US)

(72) Inventors: Karl J. Haltiner, Jr., Fairport, NY (US); Anthony J. Derose, Rochester, NY (US); Darasack C. Klotzbach, West Henrietta, NY (US); Jonathan R. Schneider, Lake Orion, MI (US)

(73) Assignee: DELPHI TECHNOLOGIES, INC., Troy, MI (US)

( * ) Notice: Subject to any disclaimer, the term of this patent is extended or adjusted under 35 U.S.C. 154(b) by 572 days.

(21) Appl. No.: 14/032,512

(22) Filed: Sep. 20, 2013

(65) Prior Publication Data

US 2015/0086898 A1 Mar. 26, 2015

(51) Int. Cl.
| | |
|---|---|
| *H01M 8/02* | (2016.01) |
| *H01M 8/0273* | (2016.01) |
| *H01M 8/0247* | (2016.01) |
| *H01M 8/0282* | (2016.01) |
| *H01M 8/1231* | (2016.01) |

(52) U.S. Cl.
CPC ....... *H01M 8/0273* (2013.01); *H01M 8/0247* (2013.01); *H01M 8/0282* (2013.01); *H01M 8/1231* (2016.02)

(58) Field of Classification Search
CPC ............. H01M 8/0247; H01M 8/0273; H01M 8/0282; H01M 8/1206; H01M 8/0271; H01M 8/0276; H01M 8/1231; Y02E 60/50
See application file for complete search history.

(56) References Cited

U.S. PATENT DOCUMENTS

| | | | |
|---|---|---|---|
| 7,306,872 B2 | 12/2007 | Haltiner, Jr. et al. | |
| 7,718,295 B2 | 5/2010 | Haltiner, Jr. et al. | |
| 8,197,982 B2 | 6/2012 | Haltiner, Jr. et al. | |
| 8,420,278 B2 | 4/2013 | De Rose et al. | |
| 2003/0077500 A1* | 4/2003 | Gorbell | H01M 8/0247 429/460 |

(Continued)

FOREIGN PATENT DOCUMENTS

| | | |
|---|---|---|
| EP | 2017914 A1 | 1/2009 |
| WO | 03/036745 A2 | 5/2003 |

OTHER PUBLICATIONS

EP Search Report; dated Jan. 22, 2015.

*Primary Examiner* — Nicholas P D'Aniello
*Assistant Examiner* — Ling R Zeng
(74) *Attorney, Agent, or Firm* — Joshua M. Haines

(57) ABSTRACT

A fuel cell cassette for forming a fuel cell stack along a fuel cell axis includes a cell retainer, a plate positioned axially to the cell retainer and defining a space axially with the cell retainer, and a fuel cell having an anode layer and a cathode layer separated by an electrolyte layer. The outer perimeter of the fuel cell is positioned in the space between the plate and the cell retainer, thereby retaining the fuel cell and defining a cavity between the cell retainer, the fuel cell, and the plate. The fuel cell cassette also includes a seal disposed within the cavity for sealing the edge of the fuel cell. The seal is compliant at operational temperatures of the fuel cell, thereby allowing lateral expansion and contraction of the fuel cell within the cavity while maintaining sealing at the edge of the fuel cell.

9 Claims, 3 Drawing Sheets

(56) References Cited

U.S. PATENT DOCUMENTS

| | | | |
|---|---|---|---|
| 2005/0079400 A1* | 4/2005 | Sugiura | H01M 8/0206 |
| | | | 429/483 |
| 2006/0110647 A1 | 5/2006 | Sherman et al. | |
| 2006/0147782 A1 | 7/2006 | Reisdorf et al. | |
| 2006/0210858 A1 | 9/2006 | Warrier et al. | |
| 2007/0134537 A1 | 6/2007 | Reisdorf et al. | |
| 2008/0050639 A1 | 2/2008 | Medina | |
| 2010/0143760 A1* | 6/2010 | DeRose | H01M 8/0271 |
| | | | 429/495 |
| 2010/0143763 A1 | 6/2010 | Haltiner, Jr. et al. | |
| 2012/0094205 A1* | 4/2012 | Chang | C03C 8/02 |
| | | | 429/465 |

\* cited by examiner

FUEL CELL CASSETTE WITH COMPLIANT SEAL

GOVERNMENT-SPONSERED STATEMENT

This invention was made with the United States Government support under Contract DE-NT003894 awarded by the U.S. Department of Energy. The Government has certain rights in this invention.

TECHNICAL FIELD OF INVENTION

The present invention relates to a fuel cell stack assembly; more particularly to a fuel cell cassette of the fuel cell stack assembly; even more particularly to a seal for the fuel cell cassette which allows lateral movement of a fuel cell within the fuel cell cassette; and still even more particularly to such a fuel cell stack assembly which is a solid oxide fuel cell stack assembly.

BACKGROUND OF INVENTION

Fuel cells are used to produce electricity when supplied with fuels containing hydrogen and an oxidant such as air. A typical fuel cell includes an ion conductive electrolyte layer sandwiched between an anode layer and a cathode layer. There are several different types of fuel cells known in the art, one of which is known as a solid oxide fuel cell. A fuel cell is assembled into a fuel cell cassette which provides flow paths for the fuel and the oxidant and provides support for the fuel cell. Multiple fuel cell cassettes are then joined together to produce a fuel cell stack which is capable of producing a desired electrical output.

Fuel cell cassettes must include a seal which provides separation of the fuel and the oxidant. However, fuel cells commonly operate at temperatures in excess of 500° C. which can make it difficult to provide such a seal which is capable of long term operation and which is able to withstand multiple thermal cycles. One known seal is comprised of a silver/copper braze. However, when the silver/copper braze is exposed to the atmosphere experienced in operation of the fuel cell, the silver/copper braze may tend to form porosity which can cause degradation to the sealing capability of the silver/copper braze. Furthermore the silver/copper braze may retain the fuel cell rigidly which may transmit high stresses to the electrolyte layer of the fuel cell and cause durability issues for the fuel cell.

What is needed is a fuel cell cassette which minimizes or eliminates one or more of the shortcomings as set forth above.

SUMMARY OF THE INVENTION

Briefly described, a fuel cell cassette is provided for forming a fuel cell stack along a fuel cell axis. The fuel cell cassette includes a cell retainer, a plate positioned axially to the cell retainer and defining a space with the cell retainer, and a fuel cell having an anode layer and a cathode layer separated by an electrolyte layer. The outer perimeter of the fuel cell is positioned in the space between the plate and the cell retainer, thereby retaining the fuel cell and defining a cavity between the cell retainer, the fuel cell, and the plate. The fuel cell cassette also includes a seal disposed within the cavity for sealing the edge of the fuel cell. The seal is compliant at operational temperatures of the fuel cell, thereby allowing lateral expansion and contraction of the fuel cell within the cavity while maintaining sealing at the edge of the fuel cell.

BRIEF DESCRIPTION OF DRAWINGS

This invention will be further described with reference to the accompanying drawings in which.

DETAILED DESCRIPTION OF INVENTION

Figure 1:
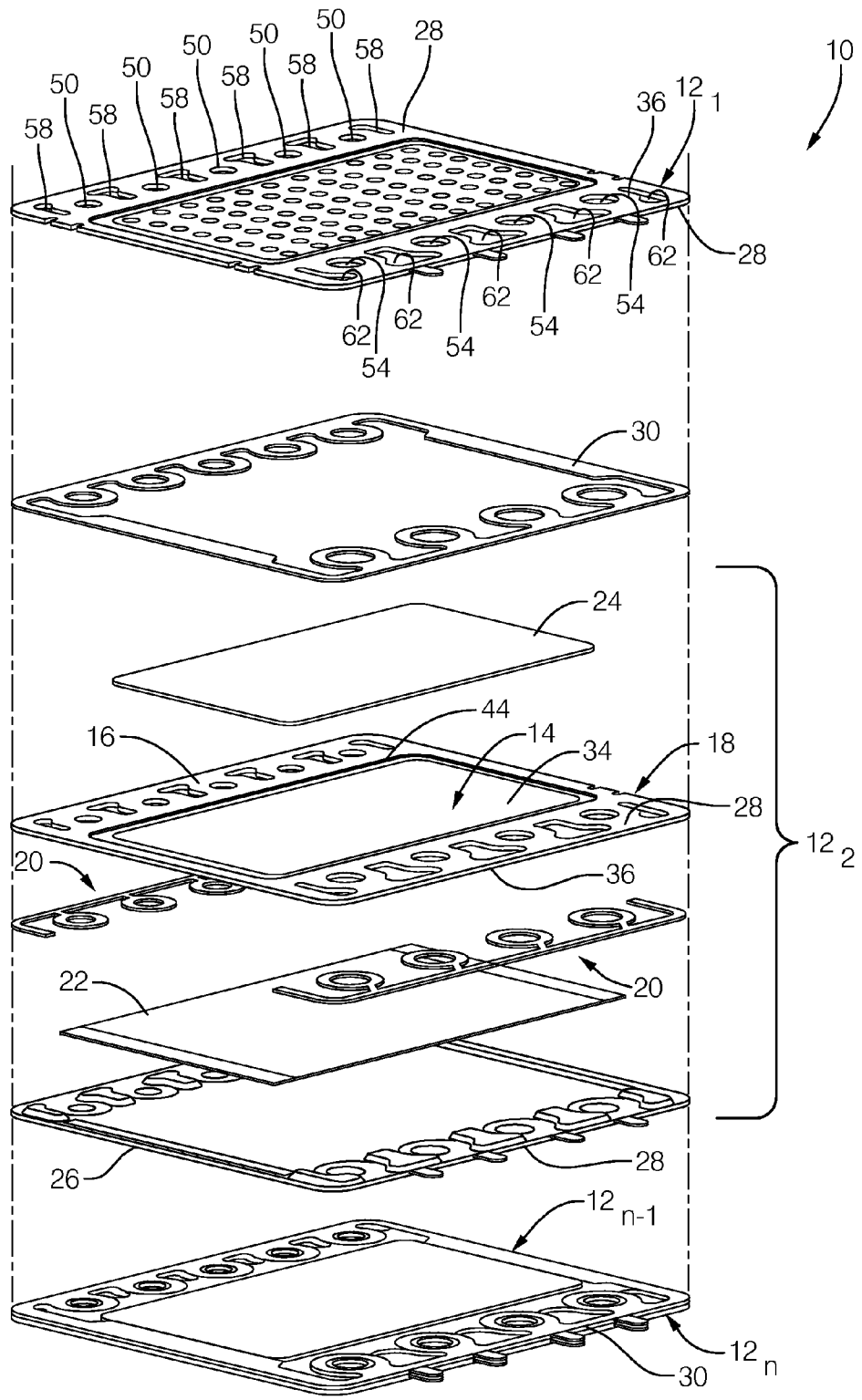
FIG. 1 is an exploded isometric view of a fuel cell stack in accordance with the invention.
Figure 2:
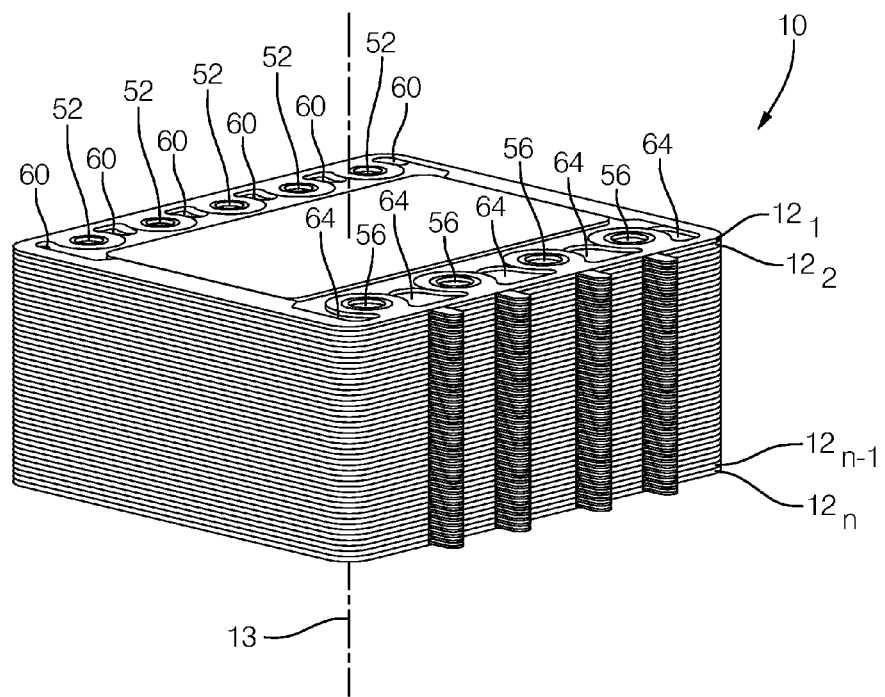
FIG. 2 is an isometric view of the fuel cell stack of FIG. 1 now shown assembled.

Referring to FIGS. 1 and 2, a fuel cell stack 10, which is illustrated as a solid oxide fuel cell stack, includes fuel cell cassettes $12_1$, $12_2$, $12_{n-1}$, $12_n$ stacked along a fuel cell axis 13 where n is the number of fuel cell cassettes in fuel cell stack 10 and the number of fuel cell cassettes n in fuel cell stack 10 is selected to provide a desired electrical output. Unless reference is being made to a specific fuel cell cassette, each of the fuel cell cassettes will be referred to generically as fuel cell cassette 12 from this point forward. Fuel cell cassette 12 includes a fuel cell 14 mounted within a cell retainer 16 to form a cell-retainer frame assembly 18, anode spacers 20, an anode interconnect 22, a cathode interconnect 24, and a separator plate 26. Fuel cell cassette 12 includes sealing surfaces 28 which are complementary to sealing surfaces 28 of the adjacent fuel cell cassette 12 to which it is joined. During assembly of fuel cell stack 10, a glass composite seal 30 is disposed between sealing surfaces 28 of adjacent fuel cell cassettes 12. Glass composite seal 30 forms a bonded joint to provide a gas tight seal to separate and contain reactants and electrically isolate adjacent separator plates 26.

Figure 3:
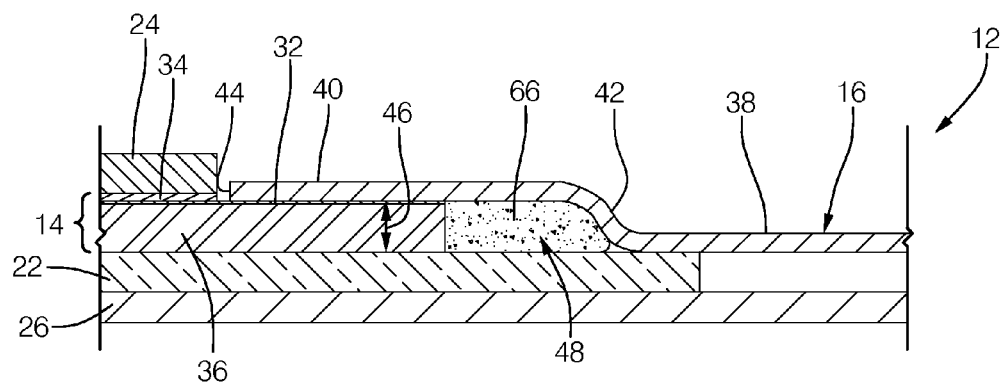
FIG. 3 is a cross-sectional view of a portion of a fuel cell cassette of the fuel cell stack of FIG. 1.

With continued reference to FIGS. 1 and 2 and now with additional reference to FIG. 3, fuel cell 14 includes an electrolyte layer 32 sandwiched between a cathode layer 34 and an anode layer 36. In use, fuel cell 14 converts chemical energy from a fuel that is passed over anode layer 36 into heat and electricity through a chemical reaction with an oxidant, for example air, that is passed over cathode layer 34 as is known in the art of fuel cells.

Cell retainer 16 is defined by an outer frame 38 and an inner frame 40 such that outer frame 38 lies in a first plane that is substantially perpendicular to fuel cell axis 13 and such that inner frame 40 lies in a second plane that is substantially parallel to the first plane. Inner frame 40 is located inward from outer frame 38, i.e. toward fuel cell axis 13. An intermediate section 42 defines a transition from outer frame 38 to inner frame 40. Inner frame 40 defines a central opening 44 therethrough which allows the oxidant to access cathode layer 34.

Anode interconnect 22 is positioned between separator plate 26 and anode layer 36 of fuel cell 14 within fuel cell cassette 12. Anode interconnect 22 is disposed adjacent to anode layer 36 in order to provide electrical communication between anode layer 36 and separator plate 26 and ultimately to an adjacent fuel cell cassette 12 which is in electrical contact with separator plate 26. Anode interconnect 22 also contains features which define flow passages between anode interconnect 22 and anode layer 36 in order to provide a path for fuel to pass across anode layer 36. A typical anode interconnect 22 is formed of a woven wire mesh of uniform thickness and is solid in a multitude of points in the direction parallel to fuel cell axis 13. Anode interconnect 22 may also be stamped sheet metal with flow features and contacts such as flattened nails and ribs. Further details of anode interconnect 22 may be found in U.S. Pat. No. 7,718,295 to Haltiner, Jr. et al., the disclosure of which is incorporated herein by reference in its entirety.

As shown in FIG. 3, anode interconnect 22 extends to outer frame 38 of cell retainer 16 where anode interconnect 22 may be secured to outer frame 38, for example by a continuous weld, a plurality of tack welds, or other suitable joining techniques or devices. As a result, a space 46 is formed axially between inner frame 40 of cell retainer 16 and anode interconnect 22 such that the perimeter of fuel cell 14 is retained within space 46 between inner frame 40 of cell retainer 16 and anode interconnect 22. The edge of fuel cell 14, cell retainer 16, and anode interconnect 22 together define a cavity 48 which will be discussed in greater detail later. As described herein, anode interconnect 22 defines a plate which is secured to outer frame 38 of cell retainer 16 and extends inward therefrom such that space 46 is defined between inner frame 40 and anode interconnect 22.

Cathode interconnect 24 is positioned adjacent to cathode layer 34 of fuel cell 14 and a separator plate 26 of an adjacent fuel cell cassette 12. Cathode interconnect 24 is disposed adjacent to cathode layer 34 in order to provide electrical communication between cathode layer 34 and an adjacent fuel cell cassette 12 via separator plate 26 of the adjacent fuel cell cassette 12. Cathode interconnect 24 also contains features which define flow passages between cathode interconnect 24 and cathode layer 34 in order to provide a path for air to pass across cathode layer 34. A typical cathode interconnect 24 is formed of a woven wire mesh of uniform thickness and is solid in a multitude of points in the direction parallel to fuel cell axis 13. Cathode interconnect 24 may also be stamped sheet metal with flow features and contacts such as flattened nails and ribs. Further details of cathode interconnect 24 may be found in U.S. Pat. No. 7,718,295 to Haltiner, Jr. et al., the disclosure of which is incorporated herein by reference in its entirety.

Fuel cell cassette 12 includes a plurality of anode supply passages 50 (for clarity, anode supply passages 50 have only been labeled on fuel cell cassette $12_1$ in FIG. 1). Anode supply passages 50 are formed along one side of fuel cell cassette 12 between fuel cell 14 and the outside edge of fuel cell cassette 12. When fuel cell cassettes $12_1$ through $12_n$ are assembled together to form fuel cell stack 10, anode supply passages 50 of each fuel cell cassette 12 are aligned with anode supply passages 50 of adjacent fuel cell cassettes 12 to form a plurality of anode supply chimneys 52. Fuel supplied at one end of fuel cell stack 10 to anode supply chimneys 52 is communicated through anode supply chimneys 52, thereby distributing fuel to each anode layer 36. Anode supply passages 50 for each fuel cell cassette 12 may be formed at regular intervals along the length of fuel cell cassette 12 to distribute fuel evenly across anode layer 36.

Fuel cell cassette 12 also includes a plurality of anode exhaust passages 54 (for clarity, anode exhaust passages 54 have only been labeled on fuel cell cassette $12_1$ in FIG. 1). Anode exhaust passages 54 are formed along the side of fuel cell cassette 12 which is opposite to the side with anode supply passages 50. Anode exhaust passages 54 are disposed between fuel cell 14 and the outside edge of fuel cell cassette 12. When fuel cell cassettes $12_1$ through $12_n$ are assembled together to form fuel cell stack 10, anode exhaust passages 54 of each fuel cell cassette 12 are aligned with anode exhaust passages 54 of adjacent fuel cell cassettes 12 to form a plurality of anode exhaust chimneys 56. Anode exhaust chimneys 56 allow anode exhaust from each fuel cell cassette 12 to be communicated to one end of fuel cell stack 10. Anode exhaust passages 54 for each fuel cell cassette 12 may be formed at regular intervals along the length of fuel cell cassette 12 in the same way as anode supply passages 50.

Fuel cell cassette 12 also includes a plurality of cathode supply passages 58 formed along the same side of fuel cell cassette 12 as anode supply passages 50 (for clarity, cathode supply passages 58 have only been labeled on fuel cell cassette $12_1$ in FIG. 1). When fuel cell cassettes $12_1$ through $12_n$ are assembled together to form fuel cell stack 10, cathode supply passages 58 of each fuel cell cassette 12 are aligned with cathode supply passages 58 of adjacent fuel cell cassettes 12 to form a plurality of cathode supply chimneys 60. An oxidant, for example air, supplied at one end of fuel cell stack 10 to cathode supply chimneys 60 is communicated through cathode supply chimneys 60, thereby distributing air to each cathode layer 34. Cathode supply passages 58 may be formed at regular intervals along the length of fuel cell cassette 12 to distribute air evenly across cathode layer 34 such that cathode supply passages 58 and anode supply passages 50 are arranged in an alternating pattern along the length of fuel cell cassette 12.

Fuel cell cassette 12 also includes a plurality of cathode exhaust passages 62 formed along the same side of fuel cell cassette 12 as anode exhaust passages 54 (for clarity, cathode exhaust passages 62 have only been labeled on fuel cell cassette $12_1$ in FIG. 1). When fuel cell cassettes $12_1$ through $12_n$ are assembled together to form fuel cell stack 10, cathode exhaust passages 62 of each fuel cell cassette 12 are aligned with cathode exhaust passages 62 of adjacent fuel cell cassettes 12 to form a plurality of cathode exhaust chimneys 64. Cathode exhaust chimneys 64 allow cathode exhaust from each fuel cell cassette 12 to be communicated to one end of fuel cell stack 10. Cathode exhaust passages 62 for each fuel cell cassette 12 may be formed at regular intervals along the length of fuel cell cassette 12 in the same way as cathode supply passages 58 such that such that cathode exhaust passages 62 and anode exhaust passages 54 are arranged in an alternating pattern along the length of fuel cell cassette 12.

In order to maintain a separation of fuel and air at the edge of fuel cell 14, a seal 66 is disposed within cavity 48. Seal 66 is a material which is compliant at operational temperatures of fuel cell stack 10. As used herein, operational temperatures of fuel cell stack 10 are temperatures of 500° C. or higher. In one example, seal 66 may be viscous glass. As defined herein, viscous glass is any glass that remains in a fully or partial amorphous phase in the standard operating temperature of fuel cell stack 10, even after prolonged periods of exposure, and retains its ability to flow. Examples of viscous glass include B—Ge—Si—O glasses which retain approximately 70% amorphous phase after 1500 hours at 850° C.; barium alkali silicate glass; and SCN-1 glass, commercially available from SEM-COM Company, Inc. Alternatively, seal 66 may be a braze material that is compliant at the operating temperature of fuel cell stack 10, for example only, braze materials that comprise a silver based alloy such as AgCu or AgPd may be used. While seal 66 hermetically seals the edge of fuel cell 14, fuel cell 14 is mechanically supported by cell retainer 16 and anode interconnect 22. Consequently, seal 66 does not support fuel cell 14. Furthermore, fuel cell 14 is able to expand and contract laterally, i.e. in a direction perpendicular to fuel cell axis 13, since seal 66 is compliant at operational temperatures of fuel cell stack 10 which prevents tensile and compressive stresses at the interface of seal 66 and fuel cell 14. In this way, durability and reliability of fuel cell 14 and fuel cell stack 10 may be realized.

Figure 4:
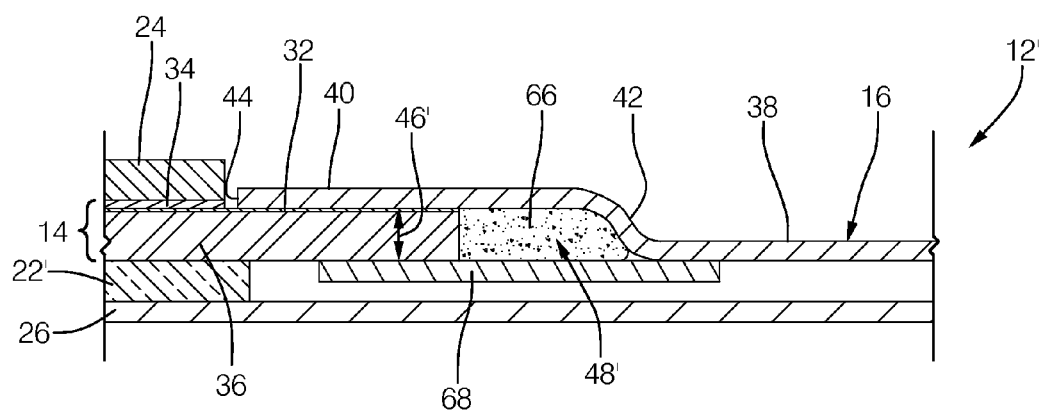
FIG. 4 is the cross-sectional view of the fuel cell cassette of FIG. 3 now showing an alternative arrangement.

Reference will now be made to FIG. 4 which shows fuel cell cassette 12' which is an alternative to fuel cell cassette 12. Fuel cell cassette 12' is substantially the same as fuel cell cassette 12 except that fuel cell cassette 12' includes anode interconnect 22' which does not extend to outer frame 38 of cell retainer 16, consequently, anode interconnect 22' does not support fuel cell 14. In order to provide support for fuel cell 14, fuel cell cassette 12' includes fuel cell support plate 68 which is substantially parallel to inner frame 40 of cell retainer 16. Fuel cell support plate 68 is secured to outer frame 38, for example by a continuous weld, a plurality of tack welds, or other suitable joining techniques or devices and extends inward toward anode interconnect 22' such that fuel cell support plate 68 surrounds anode interconnect 22'. As a result, a space 46' is formed axially between inner frame 40 of cell retainer 16 and fuel cell support plate 68 such that the perimeter of fuel cell 14 is retained within space 46' between inner frame 40 of cell retainer 16 and fuel cell support plate 68. The edge of fuel cell 14, cell retainer 16, and fuel cell support plate 68 together define a cavity 48' much like cavity 48 is defined in fuel cell cassette 12. Seal 66 is disposed within cavity 48' and provides the same benefits to fuel cell cassette 12' as it does to fuel cell cassette 12 as described above.

While this invention has been described in terms of preferred embodiments thereof, it is not intended to be so limited, but rather only to the extent set forth in the claims that follow.

We claim:

1. A fuel cell cassette for forming a fuel cell stack along a fuel cell axis, said fuel cell cassette comprising:
   a cell retainer;
   a plate positioned axially to said cell retainer and defining a space axially with said cell retainer;
   a fuel cell having an anode layer and a cathode layer separated by an electrolyte layer; an outer perimeter of said fuel cell being positioned in said space between said plate and said cell retainer, thereby retaining said fuel cell, said plate extending to said cell retainer such that said plate is secured to said cell retainer and such that a closed cavity is defined between and bounded by said cell retainer, said fuel cell, and said plate such that said cell retainer, said fuel cell, and said plate are walls of said closed cavity; and
   a seal disposed within said closed cavity and in contact with said cell retainer, said fuel cell, and said plate for sealing the edge of said fuel cell, said seal being compliant at operational temperatures of said fuel cell, thereby allowing lateral expansion and contraction of said fuel cell within said closed cavity while maintaining sealing at the edge of said fuel cell.

2. A fuel cell cassette as in claim 1 wherein:
   said cell retainer is defined by an outer frame in a first plane and an inner frame in a second plane substantially parallel to said first plane such that said inner frame is supported by said outer frame, said inner frame being located inward from said outer frame toward said fuel cell axis and defining a central opening through said cell retainer;
   said plate is attached to said outer frame of said cell retainer and extends inward therefrom such that said space is defined between said inner frame of said cell retainer and said plate; and
   the outer perimeter of said fuel cell is positioned between said plate and said inner frame of said cell retainer.

3. A fuel cell cassette as in claim 1 wherein said seal is viscous glass which remains in a fully or partial amorphous phase in standard operating temperatures of said fuel cell stack.

4. A fuel cell cassette as in claim 1 wherein said plate is an anode interconnect which is between said anode layer and a separator plate to provide electrical communication between said anode layer and said separator plate.

5. A fuel cell cassette as in claim 1 further comprising an anode interconnect which is between said anode layer and a separator plate to provide electrical communication between said anode layer and said separator plate wherein said plate surrounds said anode interconnect.

6. A fuel cell cassette as in claim 2 wherein said seal is viscous glass which remains in a fully or partial amorphous phase in standard operating temperatures of said fuel cell stack.

7. A fuel cell cassette as in claim 2 wherein said plate is an anode interconnect which is between said anode layer and a separator plate to provide electrical communication between said anode layer and said separator plate.

8. A fuel cell cassette as in claim 2 further comprising an anode interconnect which is between said anode layer and a separator plate to provide electrical communication between said anode layer and said separator plate wherein said plate surrounds said anode interconnect.

9. A fuel cell cassette for forming a fuel cell stack along a fuel cell axis, said fuel cell cassette comprising:
   a cell retainer defined by an outer frame in a first plane and an inner frame in a second plane substantially parallel to said first plane, said inner frame being located inward from said outer frame toward said fuel cell axis and defining a central opening through said cell retainer;
   a plate attached to said outer frame of said cell retainer and extending inward therefrom such that a space is defined axially between said inner frame of said cell retainer and said plate;
   a fuel cell having an anode and a cathode separated by an electrolyte layer; an outer perimeter of said fuel cell being positioned in said space between said plate and said inner frame of said cell retainer, thereby retaining said fuel cell, said plate extending to said cell retainer such that said plate is secured to said cell retainer and such that a closed cavity is defined between and bounded by said cell retainer, said fuel cell, and said plate such that said cell retainer, said fuel cell, and said plate are walls of said closed cavity; and
   a seal disposed within said closed cavity and in contact with said cell retainer, said fuel cell, and said plate for sealing the edge of said fuel cell, said seal being compliant at operational temperatures of said fuel cell, thereby allowing lateral expansion and contraction of said fuel cell within said closed cavity while maintaining sealing at the edge of said fuel cell.

\* \* \* \* \*